July 19, 1960

E. W. PATTERSON 2,945,399

AUTOMATIC COUNTERBALANCE

Filed Dec. 15, 1955

EDGAR W. PATTERSON,
INVENTOR.

BY

ATTORNEY

July 19, 1960 E. W. PATTERSON 2,945,399
AUTOMATIC COUNTERBALANCE
Filed Dec. 15, 1955 2 Sheets-Sheet 2

EDGAR W. PATTERSON,
INVENTOR.
BY
ATTORNEY

United States Patent Office 2,945,399
Patented July 19, 1960

2,945,399

AUTOMATIC COUNTERBALANCE

Edgar W. Patterson, 10710 Horton Ave., Downey, Calif.

Filed Dec. 15, 1955, Ser. No. 553,299

9 Claims. (Cl. 74—589)

My present invention is an improvement on my United States Patent Number 2,651,945 for "Hydraulic Time Compensator" and my United States Patent Number 2,671,356 for "Pneumatic Time Compensator."

My present invention relates to balancing systems and methods for automatically balancing machines which utilize reciprocal motion, and it relates particularly to apparatus and methods for automatically maintaining the correct balancing air pressure in both hydraulically driven and gear driven air-balanced pumping machines.

Air-balanced pumping units are presently widely used throughout the American oil fields, and those skilled in the art are very familiar with the air-balanced type of pumping unit. I will therefore not show or describe a complete air-balanced pumping unit herein, but will only illustrate and describe the air system of such an air-balanced pumping unit as it is particularly related to the present invention. An example of an air-balanced pumping unit to which my present invention may be applied is found in one of my prior patents, Reissue Number 20,287, March 9, 1937.

Although my prior Patent Number 2,651,945 for "Hydraulic Time Compensator" and my prior Patent Number 2,671,356 for "Pneumatic Time Compensator" each describe apparatus capable of automatically and correctly maintaining the proper balancing air pressure in an air-balanced pumping machine, the principle of operation of these prior devices was to measure the time intervals required for the up and down-strokes of a reciprocating member of the machine, to compare these time intervals and then to re-adjust the balancing pressure in response to this comparison. The devices of my said prior Patents Numbers 2,651,945 and 2,671,356, in order to keep the balancing air pressure properly adjusted at all times in response to a comparison between the times required for the up and the down-strokes, were necessarily relatively complicated devices having close tolerances and a number of moving parts.

My present invention comprises apparatus and methods for automatically adjusting the air-balancing pressure in air-balanced pumping units without the necessity of measuring the up and down-stroke time intervals, whereby my apparatus and methods are greatly simplified, requiring a minimum of structure and moving parts, requiring less rigid tolerances, and being capable of more accurately adjusting the balancing pressure in the system.

In air-balanced pumping machines, a reciprocating member, such as the walking beam, is pivotally connected to the air-balancing cylinder, which is slideably mounted over the balancing piston, which in turn is pivotally mounted on a stationary support member. The balancing cylinder is operatively connected by an air conduit to a main air vessel in which air is maintained under pressure. By this means, the downward movement of the walking beam is opposed by air pressure in the balancing cylinder, while the upward movement of the walking beam is assisted by the balancing pressure in the balancing cylinder, whereby the upward and downward strokes of the walking beam will be equal when the balancing pressure is correct. If the pumping machine is underbalanced rather than being properly counterbalanced, then the up-stroke time period will be greater than the down-stroke time period. Conversely, when the pumping machine is operating in an overbalanced condition, the down-stroke time period will be greater than the up-stroke time period. In order to pump most efficiently, and to keep stress on the pumping machine at a minimum, it is very important to have the pumping machine properly counterbalanced at all times.

While the air-balanced pump is in operation, the balancing air pressure constantly varies between a maximum pressure at the bottom of the pumping stroke (when the balancing piston and cylinder are in their most collapsed condition) and a minimum pressure at the top of the pumping stroke (when the balancing piston and cylinder are in their most extended condition). I have determined that whenever the pumping unit is perfectly balanced the true mean pressure in the system, i.e., one-half (½) of the sum of the maximum and minimum pressures, will be the same as the average pressure in the system, the average pressure being the summation of the product of increments of time and the pressure for a given number of cycles divided by the total time for that number of cycles. In other words, the balanced condition of the pump will, during each cycle, cause the pressure in the system to be above the true mean pressure for the same time interval as the pressure is below the true mean pressure.

However, whenever the pumping unit is underbalanced, the unit will accelerate during the down-stroke and will decelerate during the up-stroke. This acceleration during the down-stroke and deceleration during the up-stroke will cause respective velocity increases and decreases in the reciprocal motion of the unit. However, due to the large inertia of the reciprocating unit, both translationally and rotationally, there is a time lag of about forty-five (45°) degrees in the reflection of these velocity changes to the reciprocating unit. This causes the bottom half of the pumping cycle to be shorter in time duration than the top half of the cycle, with the net result that the average or variable mean pressure will be less than the true mean pressure when the unit is underbalanced.

Conversely, whenever the pumping unit is overbalanced, the unit will decelerate during the down-stroke and will accelerate during the up-stroke, which causes respective velocity decreases and increases in the reciprocal motion of the unit. The inertia of the system again causes a time lag of about forty-five (45°) degrees in reflecting these velocity changes to the reciprocal unit, whereby the bottom half of the pumping cycle will occupy a larger interval of time than the top half of the cycle, with the net result that the average or variable mean pressure will be greater than the true mean pressure during the overbalanced condition of the unit.

In my present invention, I compare the true mean pressure and the average, or variable mean pressure in the balancing system, which can be accomplished simply by means of the apparatus described and illustrated herein, utilizing this comparison to automatically establish the correct balancing pressure in the system at all times.

It is therefore an object of my present invention to provide a method and apparatus for automatically counterbalancing air-balanced reciprocating units responsive to a comparison between the pressure in the balancing system at a fixed point in the reciprocating cycle of the unit and the average, or variable mean pressure in the system.

Another object of my present invention is to provide a method and apparatus for automatically counterbalancing air-balanced reciprocating units responsive to a comparison between the true mean pressure in the balancing system and the average, or variable mean pressure in the balancing system.

Another object of my present invention is to provide a method and apparatus for automatically counterbalancing an air-balanced reciprocating machine which is operable in response to pressures in the air-balancing system and does not require the measurement and comparison of up-stroke and down-stroke time intervals.

A further object of my present invention is to provide a method and apparatus for automatically counterbalancing air-balanced reciprocating units which is greatly simplified and highly accurate in comparison with prior art automatic counterbalancing methods and apparatus.

Other objects and advantages of my present invention will be apparent from the following description and claims, the novelty of my invention consisting in the features of construction, the combinations of parts, the novel relations of the members and the relative proportioning, disposition and operation thereof, and the novel method steps, all as is more completely described herein and as is particularly pointed out in the appended claims.

In the accompanying drawings, forming a part of my present specification:

Figure 1:
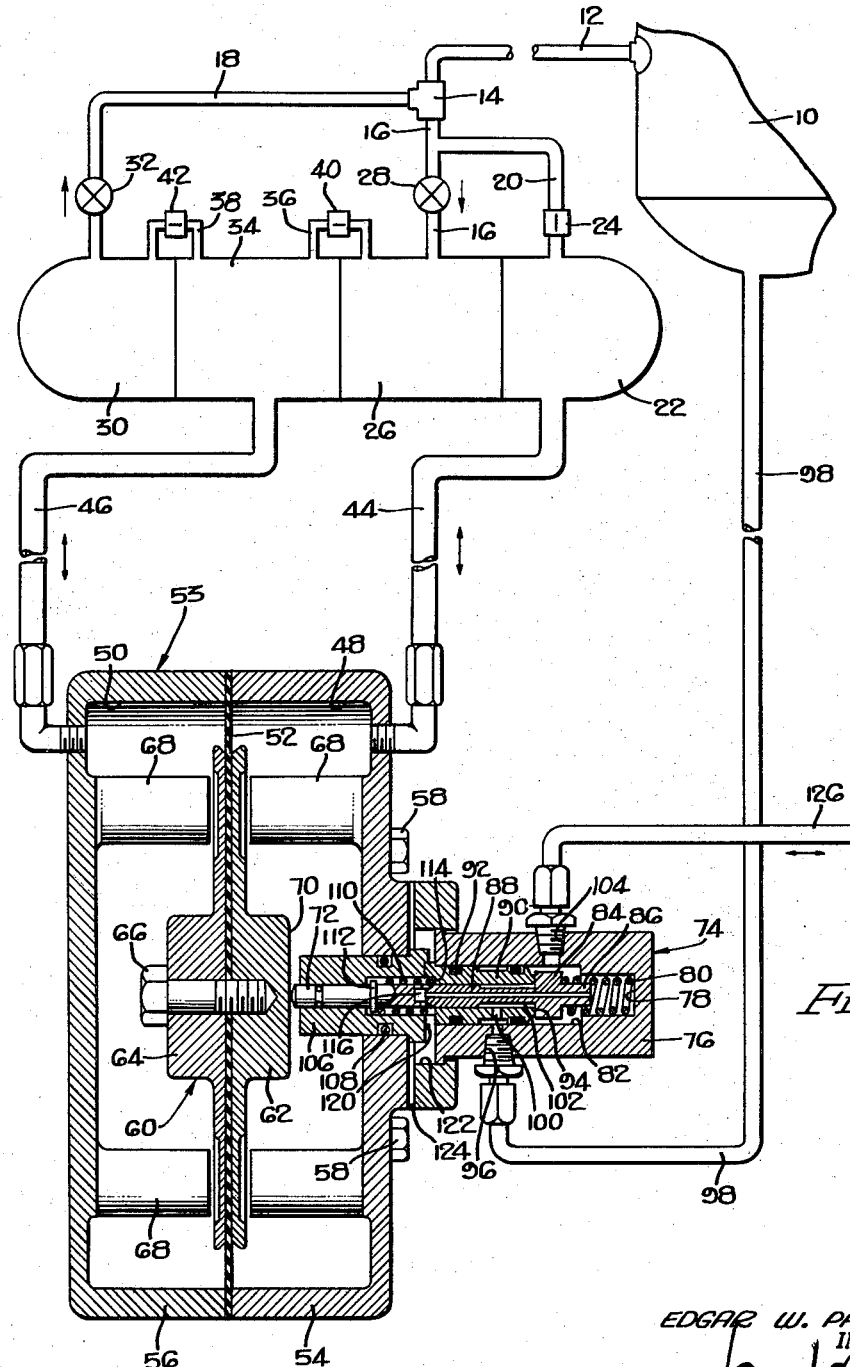
Figure 1 is a schematic view of a presently preferred embodiment of my invention, with my diaphragm, actuating valve and related parts shown in vertical section.

My preferred apparatus shown in Figure 1 of the drawings comprises a combination of relatively small air vessels suitably operatively connected to the main air vessel of the air-balanced pumping unit, these air vessels being operatively connected to identical air pressure chambers disposed on opposite sides of a diaphragm, this diaphragm being mechanically engageable with a valve mechanism that functions to control the operation of a compressor (not shown) associated with the main air vessel. The diaphragm housing and all assembled parts are, for purposes of clarity, greatly enlarged and out of proportion with respect to the air vessels 10, 22, 26 and 30 in Figure 1.

The main air vessel 10 is operatively connected to an air line 12 which is provided with a joint 14 to which air lines 16 and 18 are connected. Air line 16 is provided with a branch air line 20 which communicates with chamber 22. A restricted orifice 24 is provided in branch line 20 to prevent the air in chamber 22 from following the cyclic pressure fluctuations in main air vessel 10, but since chamber 22 is otherwise in direct communication with main air vessel 10 through lines 12, 16 and 20, the pressure within chamber 22 will correspond to the average, or variable mean pressure within main air vessel 10.

A typical operating pressure range within main air vessel 10 is a maximum pressure of three hundred fifty (350) pounds per square inch and a minimum pressure of two hundred ninety (290) pounds per square inch. Thus, the true mean pressure in main air vessel 10 would be three hundred twenty (320) pounds per square inch, which would be the average, or variable mean pressure established in chamber 22 only when the reciprocating unit is properly counterbalanced.

Line 16 is operatively connected to another small chamber 26, and a one-way, non-return valve 28, which can be an ordinary check-valve, is disposed in line 16 between branch line 20 and chamber 26, so that air is free to flow from main air vessel 10 through lines 12 and 16 into chamber 26, but air is prevented from flowing back in the reverse direction.

Another chamber 30 is operatively connected to air line 18, and a one-way non-return valve 32 is disposed in line 18 and is so directed that air is free to flow from chamber 30 through lines 18 and 12 to main air vessel 10, but is prevented from flowing in the opposite direction.

Another small chamber 34 is provided, and is operatively connected to the respective chambers 26 and 30 through lines 36 and 38, with respective restricted orifices 40 and 42 being provided in lines 36 and 38.

Chambers 26, 30 and 34, and the associated air lines, one-way valves and restricted orifices, cooperate to establish the true mean pressure of main air vessel 10 within small chamber 34 in the following manner: One way valve 28 permits air to flow freely from main air vessel 10 into small chamber 26, but prevents the return of air from small chamber 26 to main air vessel 10, whereby the pressure within small chamber 26 will be raised to the maximum pressure present in main air vessel 10, which, in our previous example, was three hundred fifty (350) pounds per square inch. The only path through which air can leave small chamber 26 is through line 36, but restricted orifice 40 in line 36 permits only a relatively small amount of air to leave chamber 26, whereby the maximum pressure of main air vessel 10 will be present in small chamber 26. Air under pressure will gradually move from chamber 26 through line 36 into chamber 34, thence through line 38 into chamber 30, but any pressure in chamber 30 that is over the minimum pressure within main air vessel 10 will, during the portion of each pumping cycle that the pressure in main air vessel 10 is at or near the minimum, readily flow through one-way valve 32 and lines 18 and 12 into main air vessel 10, whereby the minimum pressure of main air vessel 10 will be established in small chamber 30. In our previous example, this minimum pressure was two hundred ninety (290) pounds per square inch. Since air lines 36 and 38, and respective restricted orifices 40 and 42 are substantially identical, the pressure which is established in chamber 34 will be half-way between the pressures of chambers 26 and 30, which is the true mean pressure of main air vessel 10, this being three hundred twenty (320) pounds per square inch in our example.

Figure 2:
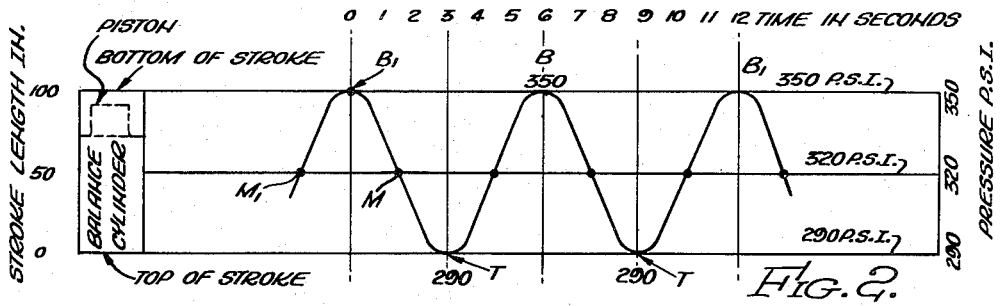
Figure 2 shows a graph illustrating the relationship between pressure, time and stroke positioning of the reciprocal unit in the balanced condition.

Referring now to Figure 2 of the drawings, I have there graphically illustrated the relationship between balancing pressure in main air vessel 10 and time. In the graph of Figure 2 I have established the maximum pressure in air vessel 10 as being 350 p.s.i. and the minimum pressure as being 290 p.s.i. The relative positioning of the balance piston and cylinder is illustrated at the extreme left of Figure 2, and the vertical plotting of pressure in p.s.i. from 290 to 350 p.s.i. will correspond to the vertical plotting at the left of Figure 2 of piston-cylinder positioning over the entire stroke length of the reciprocating member, which I have shown as being one hundred (100) inches. Thus, the maximum pressure line of 350 p.s.i. corresponds to the bottom of the stroke at the full stroke length of 100 inches, while the minimum pressure line of 290 p.s.i. corresponds to the top of the stroke or the zero (0) inches stroke position.

Figure 2 illustrates the relationship between time and pressure for the balanced condition of the pumping unit in which the forces are the same for the up-stroke and down-stroke of the reciprocating member, and hence in which the velocities and accelerations are the same during the up and down-strokes. Thus, in the balanced condition, the time-pressure curve during the upper half-cycle above 320 p.s.i. is exactly the same as the time-pressure curve during the lower half-cycle below 320 p.s.i., whereby the average pressure established in main air vessel 10 will be the same as the true mean pressure half-way between the high pressure point of 350 p.s.i. and the low pressure point of 290 p.s.i., so that the average pressure and the true mean pressure will both be 320 p.s.i.

In Figure 2 I have designated the points where the curve intersects the true mean pressure line of 320 p.s.i. on the up-stroke as M, and the points of intersection on the down-stroke as M1. It will be noted that in the balanced condition illustrated in Figure 2 the distance between M and M1 is the same as the distance between M1 and the next M, showing that the areas described by the upper and lower halves of the curve from the true mean pressure line of 320 p.s.i. are equal.

In the balanced condition of the reciprocating member illustrated graphically in Figure 2, the average, or variable mean pressure established in small chamber 22 of Figure 1 will be exactly the same as the true mean pressure that will be established in chamber 34 of Figure 1.

Figure 3:
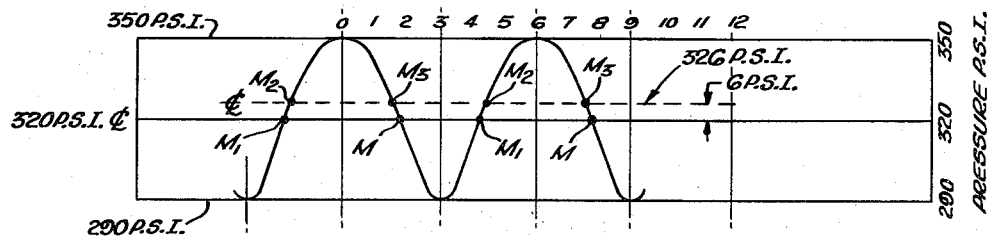
Figure 3 is a view similar to Figure 2 with the reciprocal unit overbalanced.

Referring now to Figure 3 of the drawings, I have there illustrated graphically the relationship between time and pressure for the overbalanced condition of the reciprocating member. During the overbalanced condition, the forces acting on the reciprocating member during the up-stroke are greater than the forces acting on the reciprocating member during the down-stroke, whereby the unit will tend to accelerate more during the up-stroke than during the down-stroke. Due to the heavy inertia of the system, this relative difference between the up and down-stroke accelerations will be reflected on the time-pressure curve of Figure 3 in upper halves of the curve above the true mean pressure line of 320 p.s.i. which are flatter, and which hence occupy more time, than the lower halves of the curve below the true mean pressure line of 320 p.s.i. Thus, on the curve of Figure 3, the distance between M1 and M is greater than the distance between M and M1, reading from left to right.

The fact that the area described by the upper halves of the curve in Figure 3 above the true mean pressure line of 320 p.s.i is larger than the area described by the lower halves of the curve below the true mean pressure line of 320 p.s.i. indicates a rise in the average or variable mean pressure over the true mean pressure. A line parallel to the true mean pressure line of 320 p.s.i., but above the true mean pressure line, which encloses the same area in the upper portions of the curve as it encloses in the lower portions of the curve will describe the actual average or variable mean pressure. In the illustration shown in Figure 3, the average pressure line is shown as being six (6) p.s.i. higher than the true mean pressure line, so that the average pressure is 326 p.s.i. in our example.

Thus, in the overbalanced condition, the average pressure established in chamber 22 of Figure 1 will be higher than the true mean pressure established in the chamber 34 of Figure 1, the difference in pressures between chambers 22 and 34 being 6 p.s.i. in our example.

Referring again to Figure 1, tubes 44 and 46 from respective chambers 22 and 34 communicate with respective chambers 48 and 50 disposed on opposite sides of a flexible diaphragm 52. Diaphragm 52 is disposed within diaphragm housing 53 between a pair of cupped housing sections 54 and 56, housing sections 54 and 56 being so constructed that the respective chambers 48 and 50 therein have substantially equal volume. Housing sections 54 and 56 are secured together by any conventional means, such as by means of bolts 58.

An actuator 60 is mounted on diaphragm 52, actuator 60 being composed of a pair of actuator sections 62 and 64 disposed on opposite sides of diaphragm 52, and fastened together on diaphragm 52 by means of bolt 66.

A plurality of stop-lugs 68 extend inwardly from both diaphragm housing sections 54 and 56, lugs 68 stopping short of diaphragm actuator 60, but relatively close to actuator 60. Stop-lugs 68 permit transverse movement of actuator 60 in response to a pressure differential on opposite sides of diaphragm 52, but limit the travel of actuator 60 to prevent damage to diaphragm 52. I prefer to bevel the edges of actuator sections 62 and 64 in order to further reduce the likelihood of damage to diaphragm 52.

The face 70 of actuator 60 that is disposed within chamber 48 operatively engages the exposed end of a leak-proof valve actuating stem 72 that is slidably mounted within a two-way air valve 74 mounted on diaphragm housing section 54.

Two-way air valve 74 includes valve-body 76 which is provided near its outer end with a small cylindrical chamber 78 having a coil-spring 80 mounted therein. A large cylindrical chamber 82 is disposed within valve-body 76 inwardly of and in communication with small cylindrical chamber 78, and coil-spring 80 extends into large cylindrical chamber 82 and operatively engages an annular flange 84 forming an integral part of a tubular valve element 86. The shank 88 of tubular valve element 86 is slidably mounted within a sleeve 90 which tightly fits within the inner portion of large cylindrical chamber 82, with sealing rings 92 being provided on sleeve 90 to form a sealing engagement between sleeve 90 and cylindrical chamber 82.

Flange 84 on valve element 86 is urged into sealing engagement with valve seat 94 at the outer end of sleeve 90 by spring 80 when actuating stem 72 is in the position illustrated in Figure 1. In this position of actuating stem 72 and valve element 86 air will not be permitted to pass through valve 74 in the usual manner by entering valve 74 at air pressure input port 96 that is operatively connected to main air vessel 10 through tube 98, by then passing through passages 100 and sleeve 90, passing along passage 102 provided by the reduced diameter of a portion of shank 88, passing between flange 84 and seat 94, and then out of valve 74 through two-way air port 104.

Actuating stem 72 is slidable within a sleeve member 106 that is centrally mounted through diaphragm housing section 54. A sealing engagement is provided between diaphragm housing-section 54 and the sleeve 106 by means of a sealing ring 108. Valve actuating stem 72 is normally urged to the left in Figure 1 toward actuator 60 by means of a coil-spring 110 which operatively engages a flange 112 annularly disposed on stem 72, the other end of spring 110 being seated on shoulder 114 in the end of sleeve 90.

A sealing pad 116 is affixed to the outer end of valve actuating stem 72 to provide a seat for the inner end of tubular valve element 86, so that when valve actuating stem 72 and tubular valve element 86 are in the positions illustrated in Figure 1, air will not be permitted to bleed through valve 74 by entering valve 74 through two-way air port 104, passing inwardly through the tubular valve element 86, passing between sealing pad 116 and the inner end of valve element 86 and then passing out of valve 74 into the atmosphere through passage 120, chamber 122 and clearance 124.

When the reciprocating unit is in its substantially balanced condition, the pressure in average, or variable mean pressure chamber 22 will be equal to the pressure in true mean pressure chamber 34. Since chambers 48 and 50 on opposite sides of diaphragm 52 communicate with the respective chambers 22 and 34, the pressure will likewise be equal in chambers 48 and 50 during the substantially balanced condition of the reciprocating unit. With the pressures thus equal in chambers 48 and 50, the diaphragm 52 will be in its central position, and diaphragm actuator 60 will likewise be centrally positioned, so that the slidable members within two-way valve 74 will be positioned as shown in Figure 1, preventing the passage of air in either direction through valve 74.

When the reciprocating unit becomes underbalanced, the average, or variable mean pressure within chamber 22 will be less than the true mean pressure within chamber 34, whereby the pressure within diaphragm chamber 50 will be greater than the pressure within diaphragm chamber 48. Accordingly, diaphragm 52 and actuator 60 mounted thereon will move to the right in Figure 1, causing annular flange 84 of valve element 86 to move out of sealing engagement with valve seat 94 on sleeve 90, whereby air under pressure is permitted to pass from main air vessel 10 through tube 98 and through two-way air valve 74 into two-way air line 126. Pressure within line 126 will actuate means (not shown) for causing the air compressor (not shown) to function to increase the balancing pressure within main air vessel 10.

Conversely, when the reciprocating unit becomes overbalanced, the average, or variable mean pressure within chamber 22 will become greater than the true mean pressure within chamber 34, whereby the pressure to the right of diaphragm 52 in diaphragm chamber 48 will become greater than the pressure to the left of diaphragm 52 in diaphragm chamber 50. This will cause diaphragm 52 and actuator 60 to move to the left in Figure 1, thereby unseating sealing pad 116 from its sealing engagement with the inner end of tubular valve element 86, whereby the air pressure in two-way air line 126 is relieved through two-way air valve 74 to the atmosphere. This release of pressure from line 126 actuates means (not shown) causing the compressor (not shown) associated with main air vessel 10 to idle, whereby the pressure in the system will gradually become lowered through the small amount of leakage inherently present in such a system.

It is thus apparent that any slight variation of the average, or variable mean pressure in chamber 22 relative to the true mean pressure in chamber 34 caused by the system being slightly out of balance will be immediately compensated for, whereby the system will automatically be accurately counterbalanced at all times.

Figure 4:
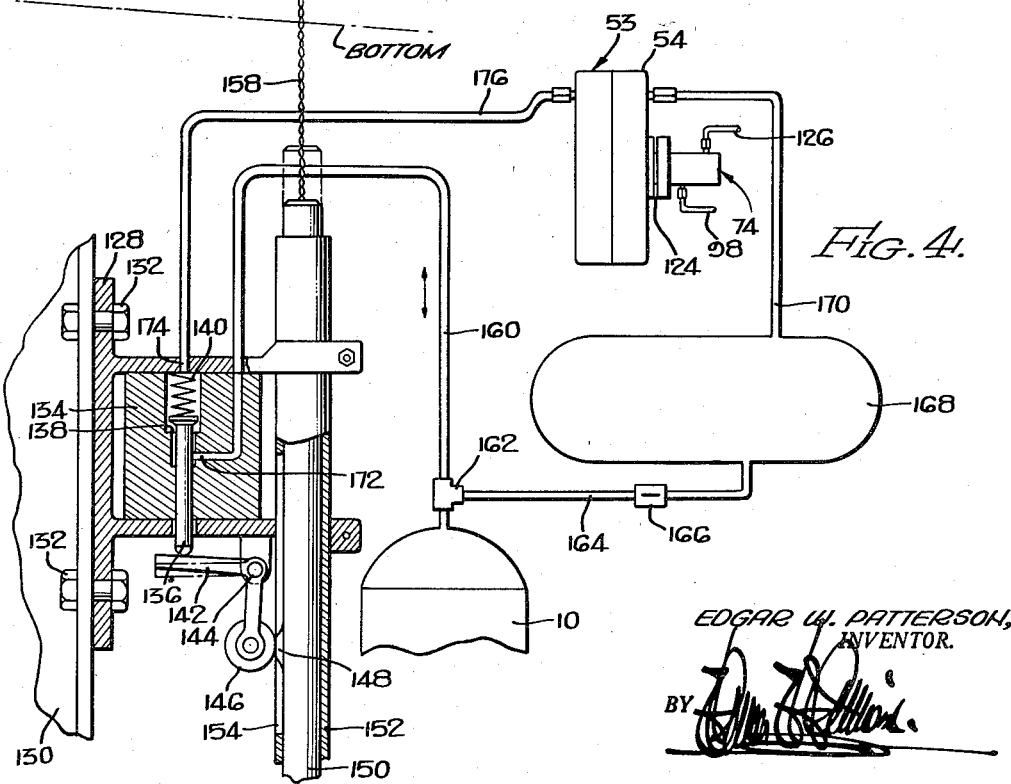
Figure 4 is a side-elevation view, partly in section, showing alternative apparatus for automatically adjusting the balancing pressure in an air-balanced reciprocating unit.

In Figure 4 of the drawings I have illustrated alternative apparatus for establishing the true mean pressure in main air vessel 10. The alternative apparatus of Figure 4 makes use of the fact that the true mean pressure within main air vessel 10 is established at the exact midpoint between the top and the bottom of the stroke of the reciprocating unit. The apparatus of Figure 4 provides mechanical means for exposing the chamber 50 to the left of diaphragm 52 to main air vessel 10 when the reciprocating member is at the exact mid-point of its reciprocating stroke.

In Figure 4 a valve support 128 is mounted on a suitable frame member 130 of the reciprocating machine by any conventional means, such as by means of a plurality of bolts 132. Support 128 supports a valve body 134 within which a valve element 136 is slideably mounted to move into and out of seating engagement with a valve seat 138. Valve element 136 is normally urged downwardly into seating engagement with valve seat 138 by means of a valve spring 140 disposed above valve element 136.

Valve element 136 extends downwardly below valve body 134 through an opening in valve support 128, and the lower end of valve element 136 is operatively engaged by valve actuating lever 142 which is pivotally mounted at 144, and which extends downwardly from pivot 144 with a roller bearing 146 being provided at its lower end.

Roller bearing 146 is operatively engaged by a projection 148 on a reciprocating actuating rod 150 that is slideably mounted within a tube 152 which is provided with an elongated slot 154 through which projection 148 extends. The upper end of reciprocating actuating rod 150 is operatively connected to the walking beam 156 by a suitable link member 158 so that actuating rod 150 will reciprocate in unison with the reciprocal movement of walking beam 156.

Proper adjustment of the length of link member 158 will cause projection 148 on actuating rod 150 to operatively engage valve actuating lever 142 to unseat valve element 136 from valve seat 138 at the exact mid-point in the stroke of the walking beam 156.

A two-way air line 160 is operatively connected to main air vessel 10, and line 160 is provided with a joint 162 which is connected to an air line 164 having a restricted orifice 166 therein. Line 164 is operatively connected with average, or variable mean pressure chamber 168 which operates in exactly the same manner as chamber 22 of Figure 1. Average, or variable mean pressure chamber 168 is operatively connected to diaphragm housing section 54 to cause the average, or variable mean pressure to be established in diaphragm housing 53 to the right of the diaphragm.

A valve port 172 below valve seat 138 is operatively connected to air line 160, so that when valve element 136 is raised at the mid-point of the stroke of the reciprocating member, air is permitted to flow from main air vessel 10 to line 160, through valve port 172 and past valve seat 138, and then through valve port 174 and line 176 to diaphragm housing section 56, whereby the true mean pressure will be established to the left of the diaphragm in diaphragm housing 53.

Since main air vessel 10 is thus operatively connected to the chamber to the left of the diaphragm in diaphragm housing 53 only when the reciprocating member is at the exact mid-point of its stroke and when the pressure within the main air vessel 10 is therefore at the true mean pressure, it is obvious that the true mean pressure will be established within diaphragm housing 53 to the left of the diaphragm.

Since the average, or variable mean pressure will be established to the right of the diaphragm and the true mean pressure will be established to the left of the diaphragm by the apparatus shown in Figure 4, and this same condition exists relative to the diaphragm housing in Figure 1, the apparatus shown in Figure 4 will operate to counterbalance the reciprocating unit in exactly the same manner as the apparatus illustrated in Figure 1.

In its broad scope, my present invention comprises the method of determining the balance condition of an air-balanced reciprocating unit in which the average, or variable mean balancing pressure is compared with the pressure in the balancing system at a substantially fixed point in the cycle of operation of the reciprocating unit. My presently preferred embodiments shown in Figures 1 and 4 of the drawings comprise two different species of this broad invention which both compare the average, or variable mean presure in the system with the pressure in the balancing system at the particular fixed point of the cycle of the reciprocating unit which corresponds to the center of the stroke of the reciprocating unit, this pressure at this particular central point of the stroke having been designated herein as the "true mean" pressure. However, it is to be understood that the average, or variable mean pressure in the system will also vary for different balance conditions relative to the pressure in the system at any other fixed point in the cycle of the reciprocating unit.

My apparatus of Figure 1 and that of Figure 4 appear to have quite different modes of operation in that the apparatus of Figure 1 separates the true mean pressure of the system from the average, or variable mean pressure of the system by merely utilizing the plurality of tubes, chambers, one-way valves and orifices, while the apparatus of Figure 4 utilizes mechanical apparatus for sampling the pressure in the system at the center of the reciprocation cycle of the unit. However, the two apparatus of Figures 1 and 4 have the close similarity of operation of both sampling the air pressure in the air-balancing system at particular points in the cycle of operation of the reciprocating unit. Thus, although the apparatus of Figure 1 does not sample the pressure at particular points in the cycle of operation in the obvious mechanical manner of the apparatus of Figure 4, it nevertheless samples the pressure at the bottom of the stroke in chamber 26 and at the top of the stroke in chamber 30, utilizing these samplings to produce a pressure that corresponds to the true mean pressure at the center-point of the stroke, in chamber 34.

It is to be understood that although a presently preferred means for alternatively actuating the compressor (not shown) associated with the main air vessel 10 and causing said compressor to idle is my two-way air valve 74, other devices can be used in place of two-way air valve 74. For example, in certain applications of my present invention wherein it may be advantageous to use electricity instead of air as the secondary actuating medium, it would be a simple matter for one skilled in the art to substitute an electric make and break contact device for two-way air valve 74 whereby a clutch could be moved into and out of engagement, in turn causing a compressor (not shown) to supply and discharge air respectively, precisely in the same way that my two-way air valve 74 controls the air supply for air-balanced units.

With reference to Figure 1, it is to be understood that tubes 44 and 46 may be reversed, whereby tube 44 would serve diaphragm chamber 50 and tube 46 would serve diaphragm chamber 48. Also, in Figure 4, lines 170 and 176 may likewise be reversed without affecting the proper functioning of the automatic counterbalance, provided the actuating means (not shown) heretofore described, for either replenishing or cutting off the air supply to the system is arranged to function in the reverse order. In other words, the compressor, or air supply will be caused to idle or to be cut off when pressure is admitted to line 126, and conversely, air will be replaced in said balancing system when air is exhausted from line 126.

If it is desired, chambers 48 and 50 in Figure 1 may be enlarged to permit the complete elimination of the auxiliary chambers 22 and 54.

Pursuant to my above description, the term "true means pressure," as used hereinabove and as used in the appended claims, is hereby defined as the pressure of the balancing system at the center of the stroke of the reciprocating unit being balanced, which is equal to one-half of the sum of the maximum and minimum pressures in the balancing system during a complete stroke of the reciprocating unit being balanced.

Similarly, pursuant to my above description, the term "average pressure," as used hereinabove and as used in the appended claims, is hereby defined as the summation of the product of increments of time and pressure for a given number of cycles divided by the total time for that number of cycles.

It is to be understood that the form of my invention herein shown and described is my preferred embodiment and that various changes in the shape, size, arrangement of parts and method steps may be resorted to without departing from the spirit of my invention, or the scope of the appended claims.

I claim:

1. Apparatus for automatically balancing a reciprocating unit having an air-balancing system including a first pressure chamber, periodic means for operatively connecting said first chamber to said air-balancing system at substantially a fixed point in the cycle of said reciprocating unit to establish a pressure in said first chamber corresponding to a fixed point in the reciprocation cycle of said reciprocating unit, a second pressure chamber operatively connected to said air-balancing system to establish substantially the average pressure of said air-balancing system in said second chamber, and an output member operatively connected to both of said pressure chambers, said output member being operatively connectable to means for balancing said balancing system.

2. Apparatus for automatically balancing a reciprocating unit having an air-balancing system including a true mean pressure chamber, means operatively connecting said true mean pressure chamber to said air-balancing system for establishing substantially the true mean pressure of said balancing system in said true mean pressure chamber, an average pressure chamber, means operatively connecting said average pressure chamber to said air-balancing system for establishing substantially the average pressure of said balancing system in said average pressure chamber, and an output member operatively connected to both of said pressure chambers, said output member being operatively connectable to means for balancing said system.

3. Apparatus for automatically balancing a reciprocating unit having an air-balancing system including a true mean pressure chamber, a pair of auxiliary chambers each of which is operatively connected to said true mean pressure chamber through a restricted orifice, air lines operatively connecting the air-balancing system to each of said auxiliary chambers, one of said air lines having a one-way valve permitting the flow of air toward the respective auxiliary chamber and the other said air line having a one-way valve permitting the flow of air away from the respective auxiliary chamber, an average pressure chamber operatively connected to said air-balancing system to establish substantially the average pressure of said air-balancing system in said average pressure chamber, and an output member operatively connected to both of said pressure chambers, said output member being operatively connectable to means for balancing said system.

4. Apparatus for automatically balancing a reciprocating unit having an air-balancing system including a pair of pressure chambers separated by a pressure differential responsive member, a pair of auxiliary chambers, both of which are operatively connected to one of said pressure chambers through a restricted orifice, and air lines operatively connecting the air-balancing system to each of said auxiliary chambers, one of said air lines having a one-way valve permitting the flow of air toward the respective auxiliary chamber and the other said air line having a one-way valve permitting the flow of air away from the respective auxiliary chamber, the other said pressure chamber being operatively connected to said air-balancing system to establish substantially the average pressure of said air-balancing system in said other pressure chamber, said pressure differential responsive member being operatively connectable to means for balancing said system.

5. Apparatus for automatically balancing a repracating unit having an air-balancing system including a true mean pressure chamber, a pair of auxiliary chambers each of which is operatively connected to said true mean pressure chamber through a restricted orifice, air lines operatively connecting the air-balancing system to each of said auxiliary chambers, one of said air lines having a one-way valve permitting the flow of air toward the respective auxiliary chamber and the other said air line having a one-way valve permitting the flow of air away from the respective auxiliary chamber, an average pressure chamber operatively connected to said air-balancing system to establish substantially the average pressure of said air-balancing system in said average pressure chamber, and a pair of diaphragm pressure chambers separated by a pressure differential responsive diaphragm and respectively operatively connected to said true mean and average pressure chambers, said diaphragm being operatively connectable to means for balancing said system.

6. Apparatus for automatically balancing a reciprocating unit having an air-balancing system including a true mean pressure chamber, periodic means for operatively connecting said true mean pressure chamber to said air-balancing system at substantially the mid-point in the cycle of said reciprocating unit to establish substantially the true mean pressure in said true mean pressure chamber, an average pressure chamber continuously operatively connected to said air-balancing system to establish substantially the average pressure of said air-balancing system in said average pressure chamber, and an output member operatively connected to both of said pressure chambers, said output member being operatively connectable to means for balancing said system.

7. Apparatus for automatically balancing a reciprocating unit having an air-balancing system including a first pressure chamber, an air conduit operatively connecting said first chamber and the air-balancing system, a valve in said conduit actuated by synchronous reciprocal motion of said unit to periodically open said conduit at a fixed point in the reciprocation cycle of said reciprocating unit, a second pressure chamber operatively connected to said air-balancing system to establish the average pressure of said air-balancing system in said second chamber, and an output member operatively connected to both of said pressure chambers, said output member being operatively connectable to means for balancing said system.

8. Apparatus for automatically balancing a reciprocating unit having an air-balancing system including a true mean pressure chamber, an air conduit operatively connecting said true mean pressure chamber and the air-balancing system, a valve in said conduit actuated by synchronous reciprocal motion of said unit to periodically open said conduit at substantially the mid-point in the cycle of said reciprocating unit to establish substantially the true mean pressure in said true mean pressure chamber, an average pressure chamber operatively connected to said air-balancing system to establish the average pressure of said air-balancing system in said average pressure chamber, and an output member operatively connected to both of said pressure chambers, said output member being operatively connectable to means for balancing said balancing system.

9. Apparatus for automatically balancing a reciprocating unit having an air-balancing system including a true mean pressure chamber, an air conduit operatively connecting said true mean pressure chamber and the air-balancing system, a valve in said conduit actuated by synchronous reciprocal motion of said unit to periodically open said conduit at substantially the mid-point in the cycle of said reciprocating unit to establish substantially the true mean pressure in said true mean pressure chamber, an average pressure chamber operatively connected to said air-balancing system to establish the average pressure of said air-balancing system in said average pressure chamber, a pair of diaphragm pressure chambers separated by a pressure differential sensitive diaphragm and respectively operatively connected to said true mean and average pressure chambers, and an operative connection between said diaphragm and means for balancing said balancing system.

References Cited in the file of this patent

UNITED STATES PATENTS

| | | |
|---|---|---|
| 669,391 | Hillenbrand | Mar. 5, 1901 |
| 1,880,904 | Duckworth et al. | Oct. 4, 1932 |
| 2,218,214 | O'Leary | Oct. 15, 1940 |
| 2,459,334 | Patterson et al. | Jan. 18, 1949 |
| 2,547,377 | Juhasz | Apr. 3, 1951 |
| 2,671,356 | Patterson | Mar. 9, 1954 |